R. TEMPLE.
ROCK CUTTING APPARATUS.
APPLICATION FILED SEPT. 13, 1913.
1,330,825. Patented Feb. 17, 1920.
14 SHEETS—SHEET 2.
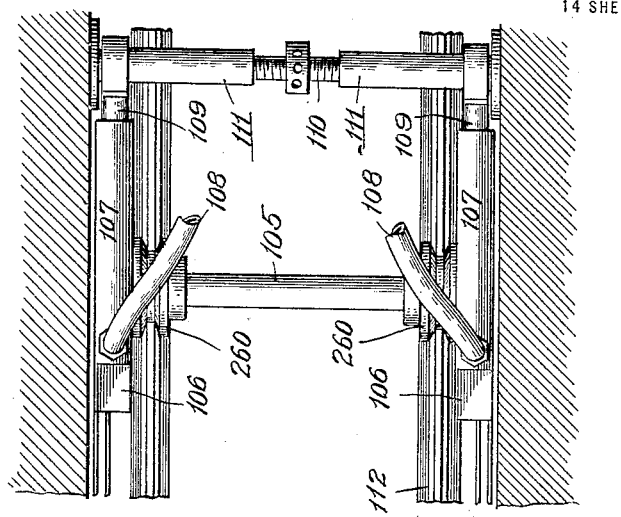
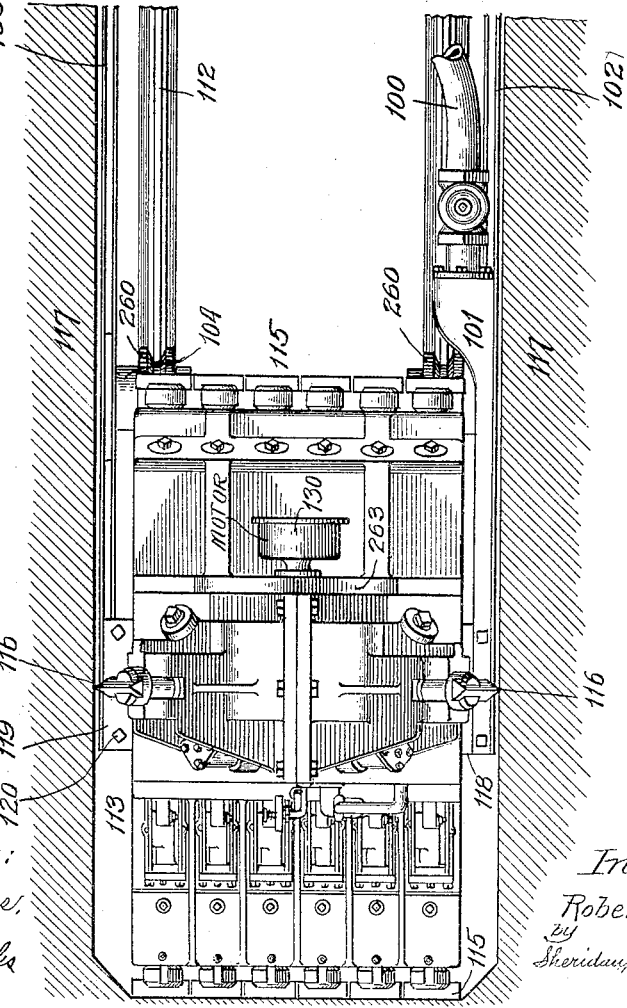
Fig. 2.
Witnesses:
John Enders,
Henry A. Parks
Inventor:
Robert Temple,
by Sheridan, Wilkinson & Scott
Attys.

R. TEMPLE.
ROCK CUTTING APPARATUS.
APPLICATION FILED SEPT. 13, 1913.
1,330,825.
Patented Feb. 17, 1920.
14 SHEETS—SHEET 8.
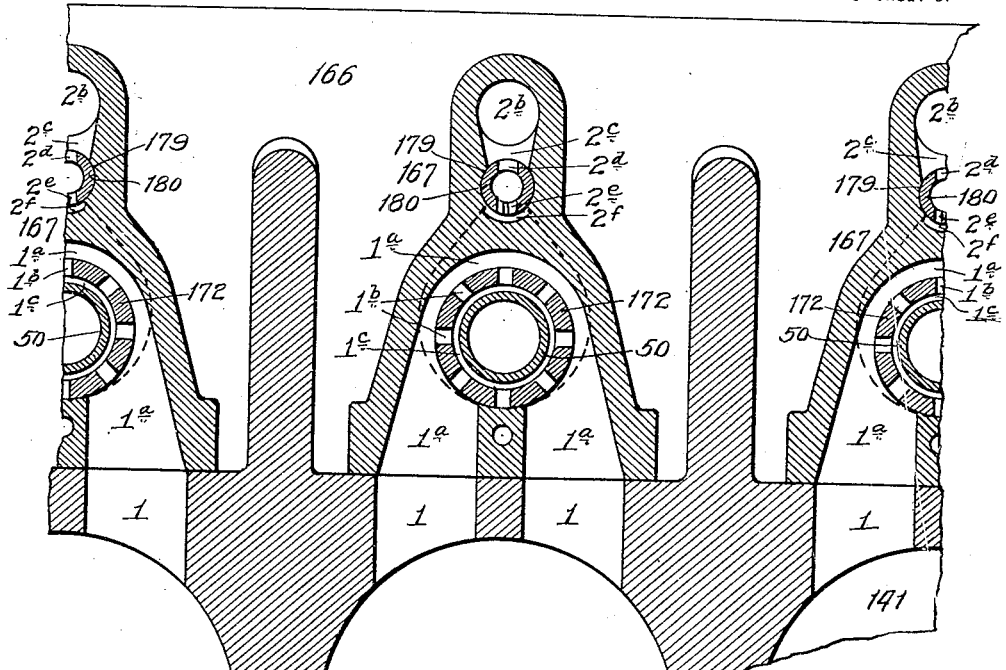
Fig. 8.
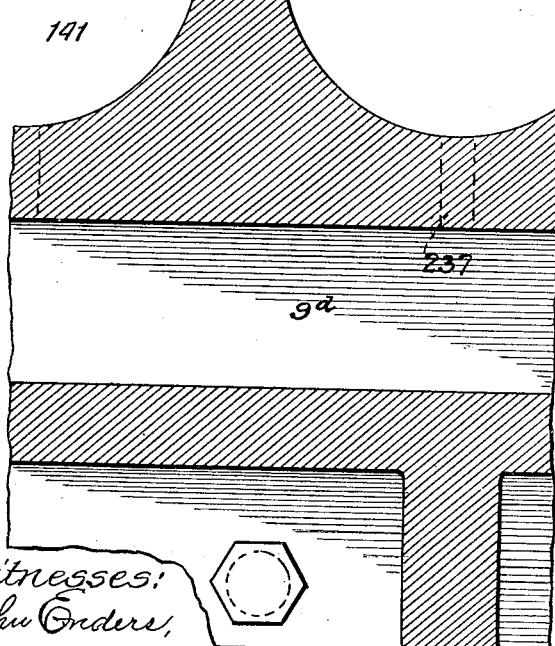
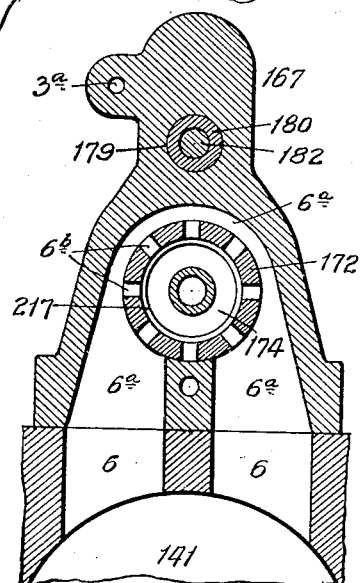
Fig. 8ª.
Witnesses:
John Enders,
Henry A. Parks
Inventor:
Robert Temple,
by Sheridan, Wilkinson & Scott
Attys.

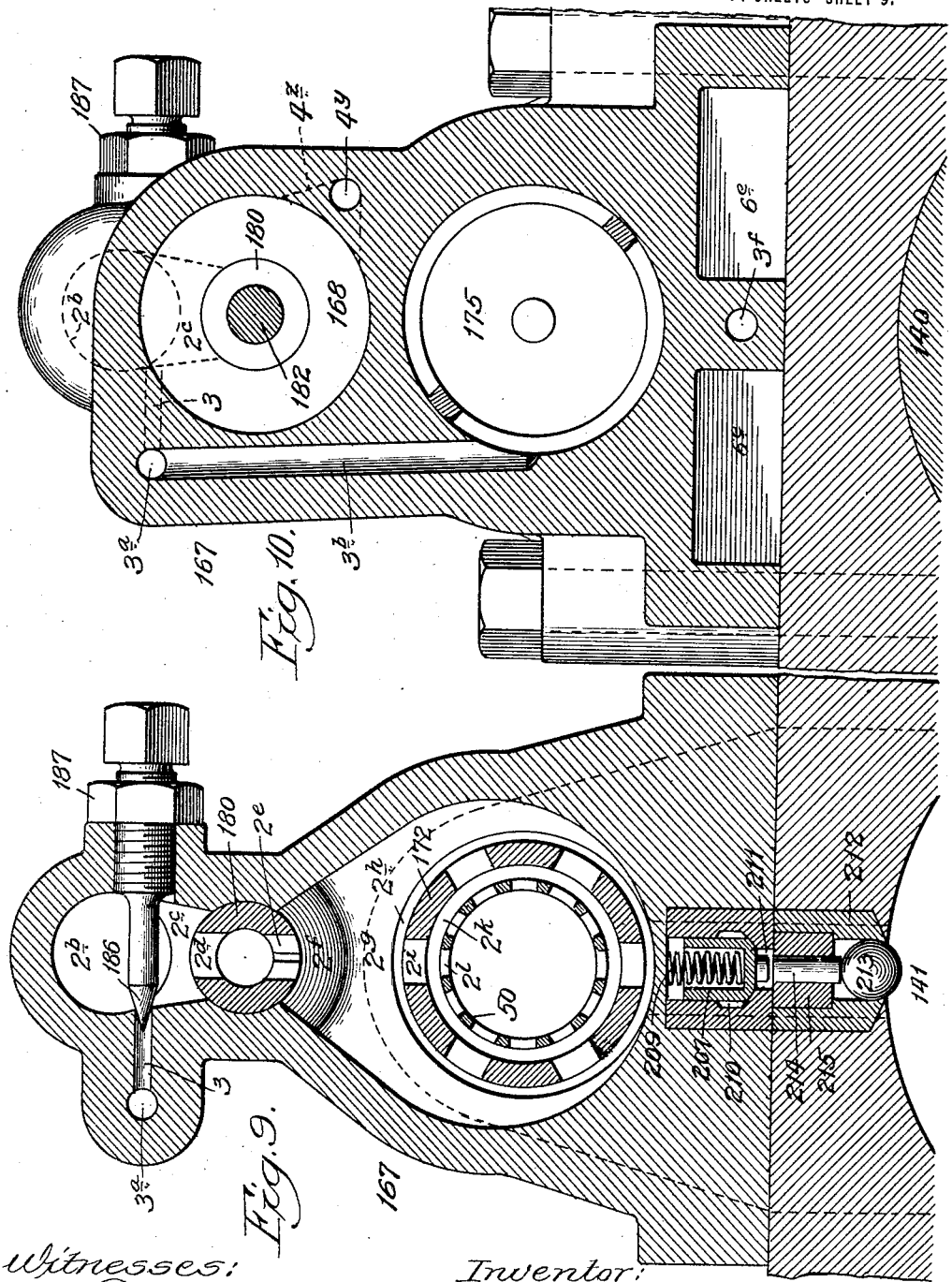

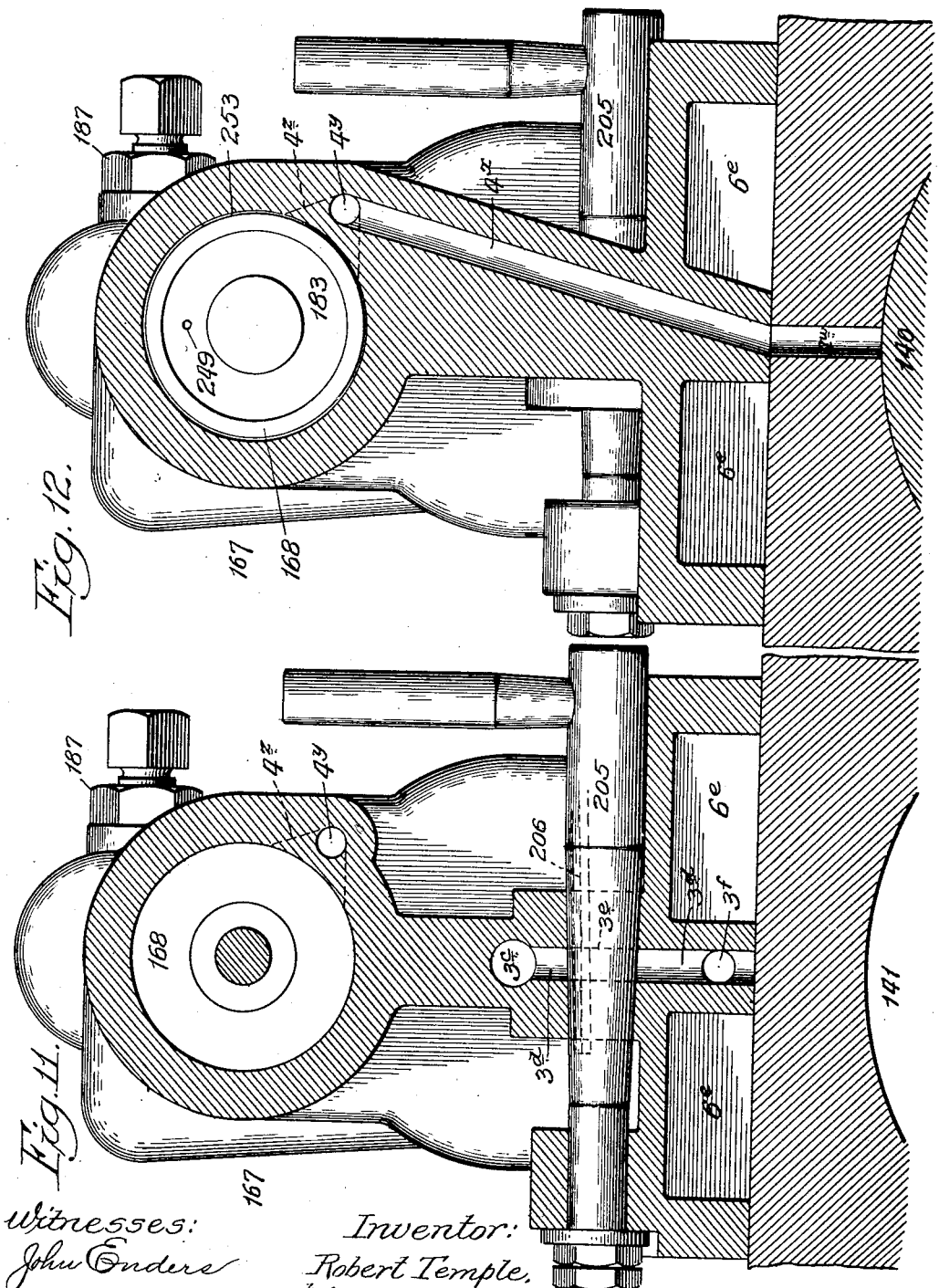

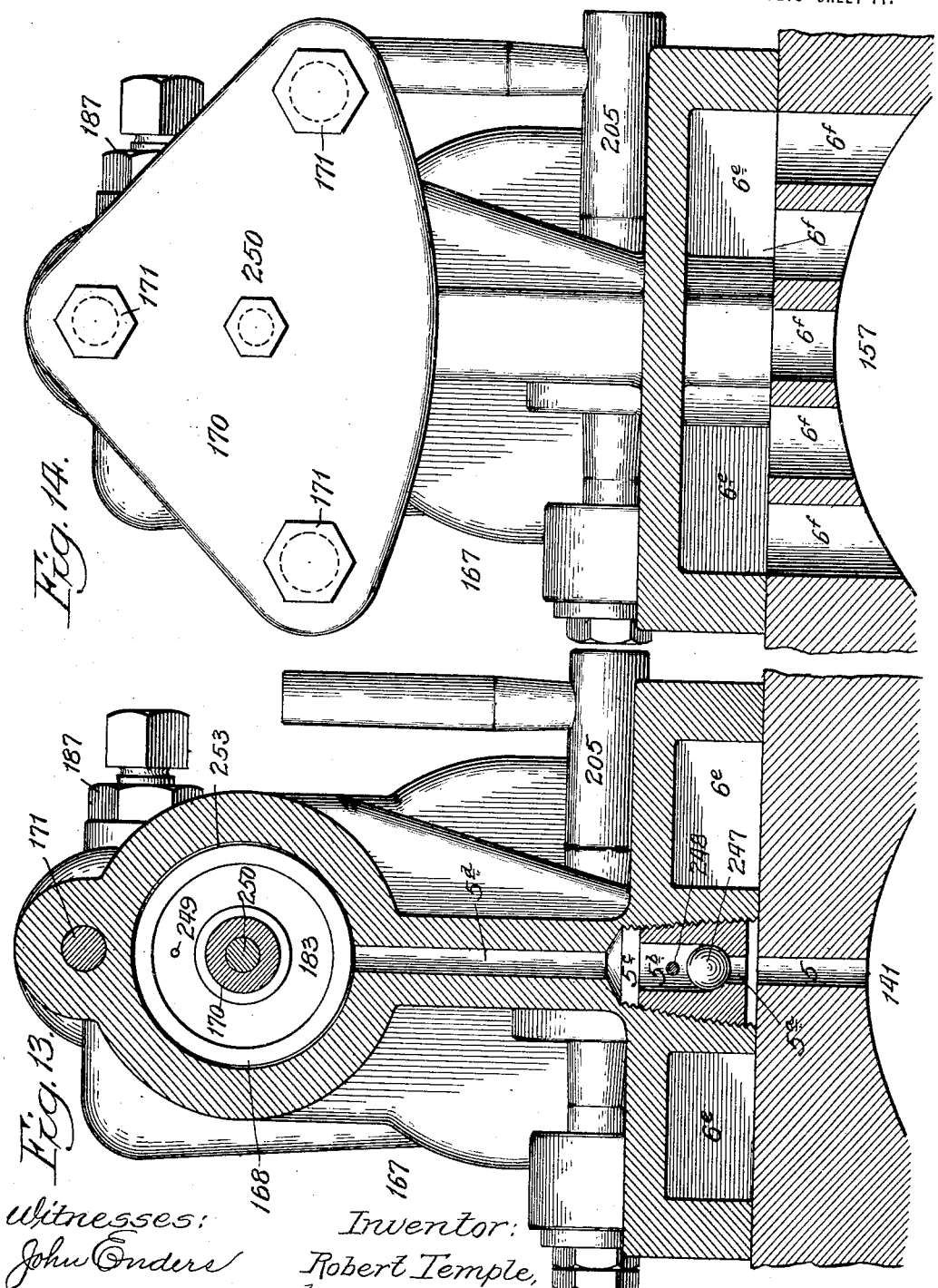

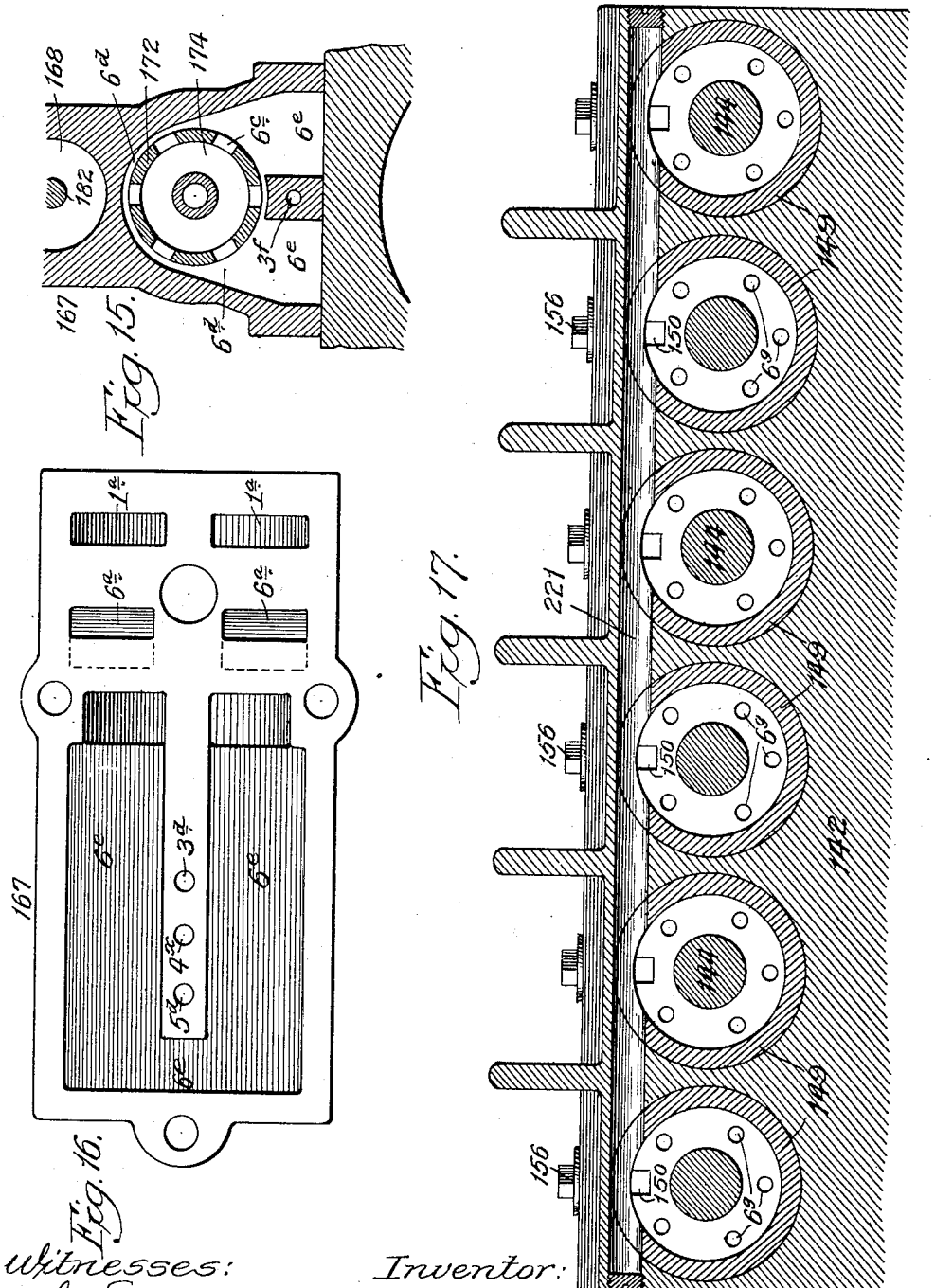

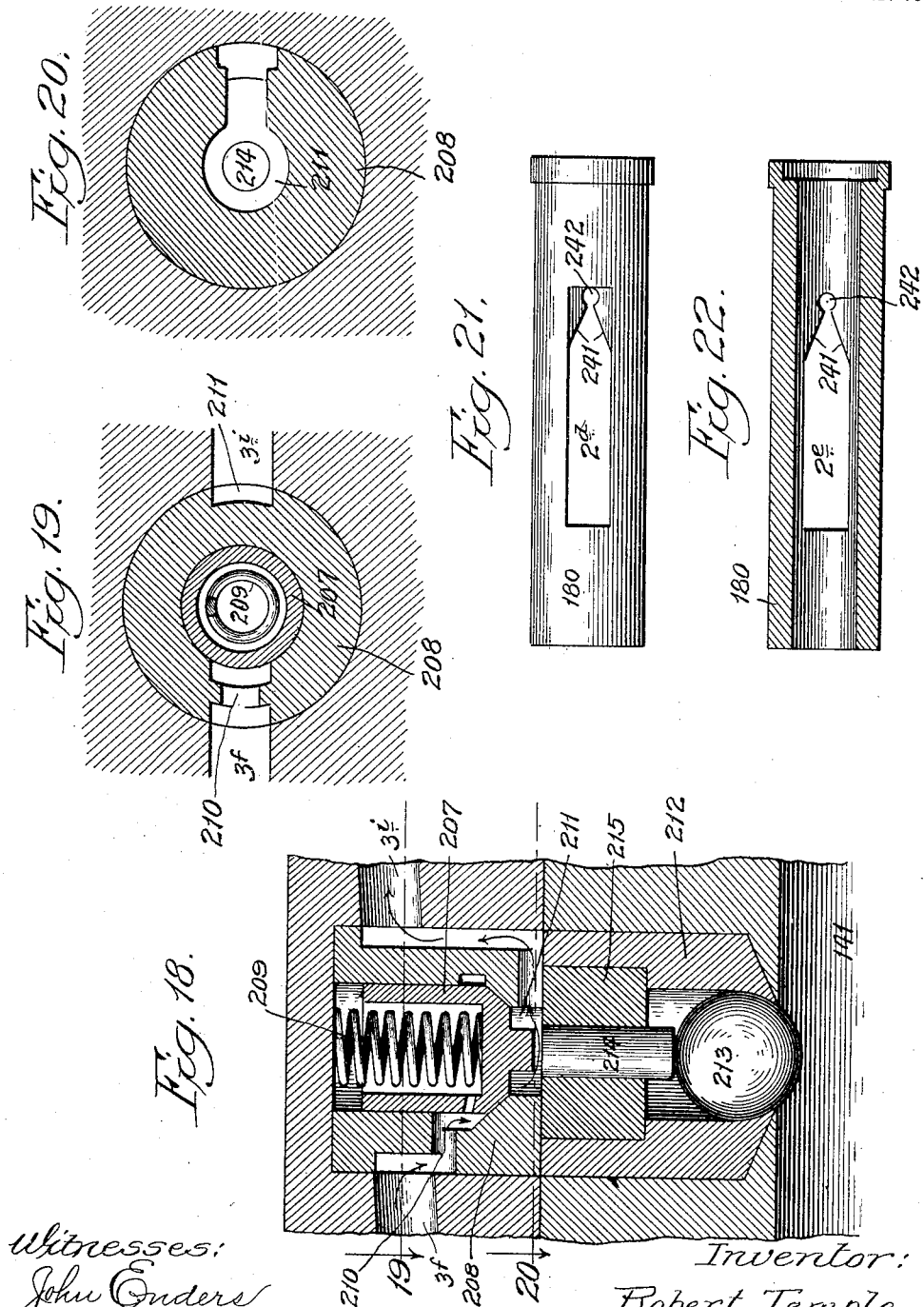

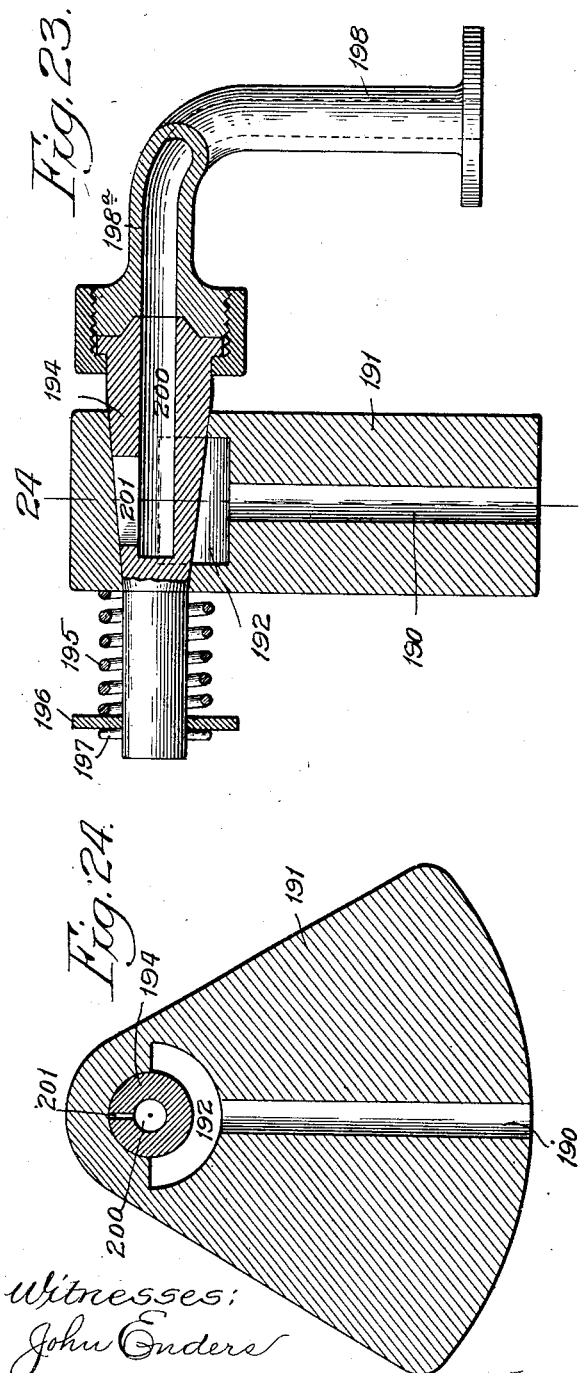

UNITED STATES PATENT OFFICE.

ROBERT TEMPLE, OF DENVER, COLORADO, ASSIGNOR TO IMPERIAL TUNNELLING MACHINE COMPANY, A CORPORATION OF ARIZONA.

ROCK-CUTTING APPARATUS.

1,330,825.  Specification of Letters Patent.  Patented Feb. 17, 1920.

Application filed September 13, 1913. Serial No. 789,600.

*To all whom it may concern:*

Be it known that I, ROBERT TEMPLE, a citizen of the United States, residing at Denver, in the county of Denver and State of Colorado, have invented certain new and useful Improvements in Rock-Cutting Apparatus, of which the following is a specification.

The object of my invention is to provide efficient rock cutting means. I describe and illustrate herein a tunneling machine, that is a machine adapted to advance through rock in a horizontal or a substantially horizontal plane, but many of the features of my invention are applicable to use in sinking shafts and many of the details of my invention will also find utility in still other connections. While the apparatus herein described and illustrated is at the present time the preferred embodiment of my invention, the invention can be embodied in many mechanically different forms of mechanism and is not limited to the precise construction herein made the basis of explanation.

In the drawings—

Fig. 2 is a plan view of the same, both Figs. 1 and 2 being broken away at the central part to indicate that the apparatus as an entirety may be of greater or less length as found expedient and desirable.

Figure 7:
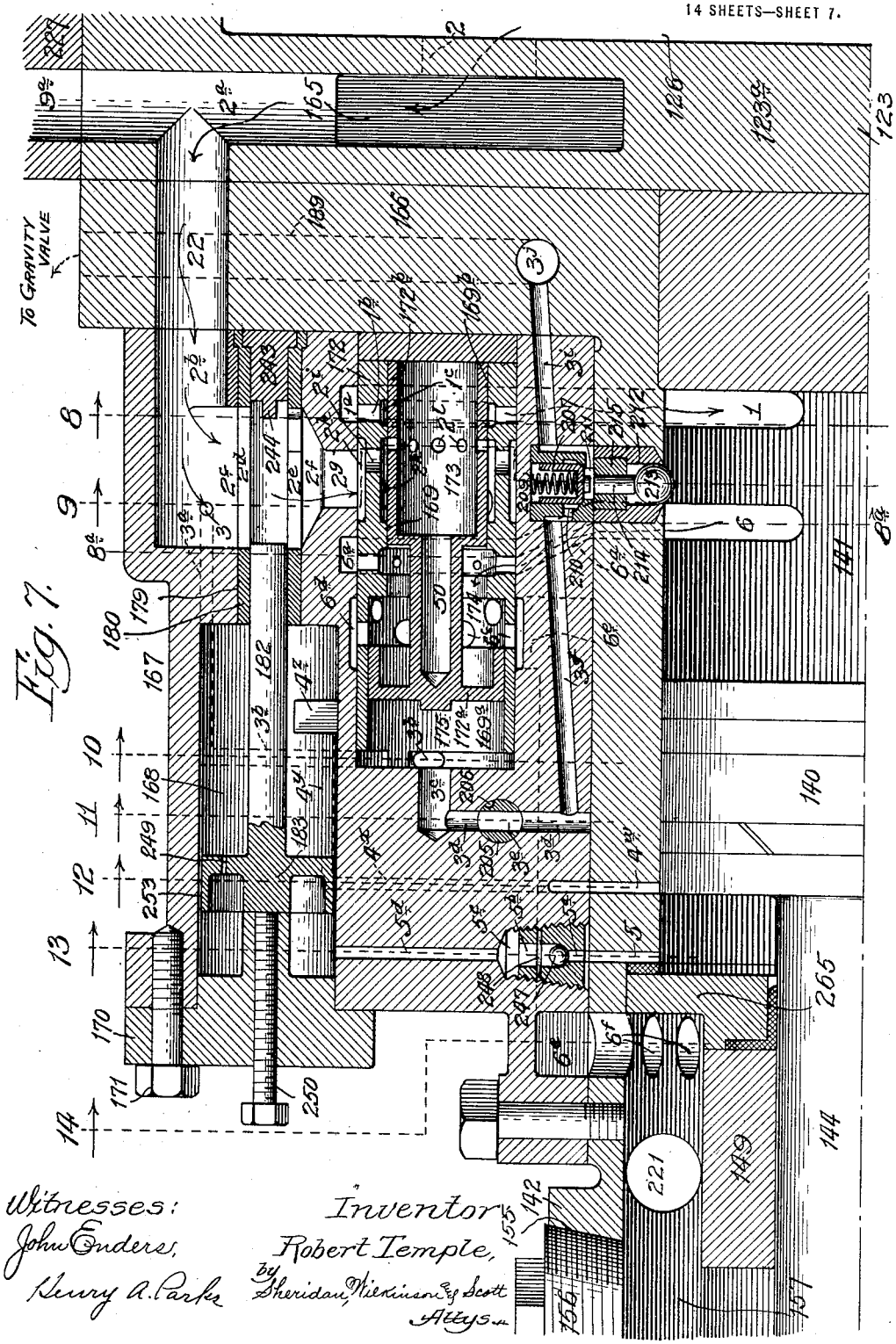
Fig. 7 is a vertical section through the valve mechanism and some of the adjoining parts of one of the two straight cutters at the center of the series of six, which operate side by side.

Figs. 8 to 15 inclusive, are transverse sections through the valve mechanism illustrated in Fig. 7, the sections being taken upon the lines appearing in Fig. 7 with numerals corresponding to those of the sectional views.

Fig. 16 is a bottom view of the valve casing shown in Fig. 7 and other views.

Figure 6:
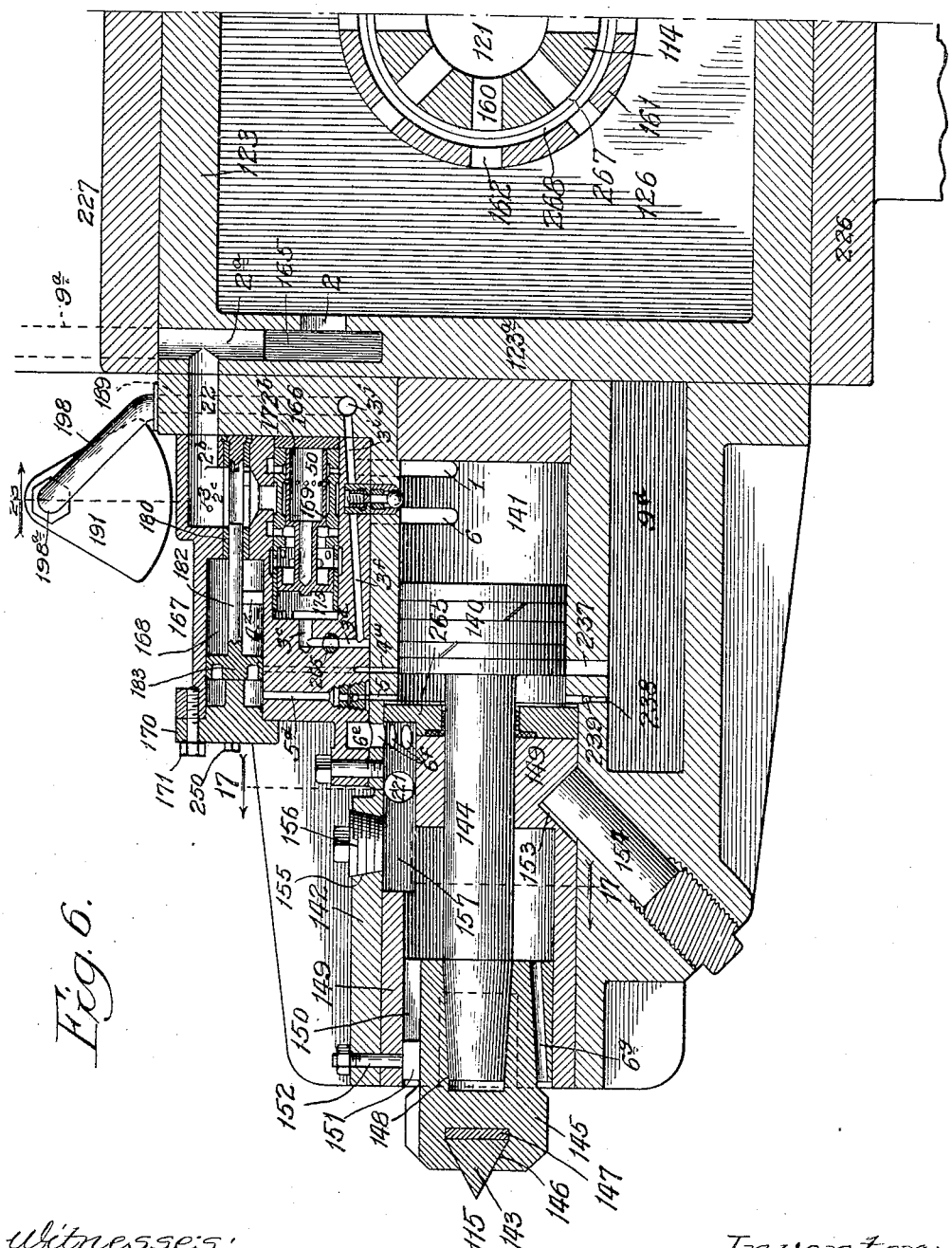
Fig. 6 is a vertical section through one of the cutters and its actuating mechanism, the particular cutter illustrated being one of those designed to act in line with the axis of the rock cut, these cutters being termed hereinafter for the sake of brevity straight cutters.

Fig. 17 is a vertical transverse section through the cutter guides upon the irregular line 17 appearing upon Fig. 6.

Fig. 18 is a vertical sectional view of a tappet vent valve shown in Figs. 6 and 7.

Figs. 19 and 20 are horizontal sectional views through the tappet valve upon the lines 19 and 20 of Fig. 18.

Fig. 21 is a plan view of the throttle valve bushing.

Fig. 22 is a horizontal sectional view of the throttle valve bushing showing the lower opening through the bushing, the upper opening being shown in Fig. 21.

Fig. 23 is a sectional view of a gravity vent valve.

Fig. 24 is a sectional view of the vent valve upon the line 24 of Fig. 23.

Fig. 25 is a sectional view of a pressure reducing valve forming part of the apparatus.

Fig. 26 is a detail view of an air motor and gearing which rotates the cutting head.

In the foregoing description of the drawings and in the following descriptive matter I frequently define the position of the various parts by reference to their position as illustrated. It will be obvious, however, that the various parts of the rotative head are invested with the rotation thereof, and that the terms "above", "below", etc., are used merely for convenience in describing the mechanism in the position illustrated.

In its general construction the apparatus comprises side members 102 and 103, each composed of two plates, the side members being mounted upon and connected by trucks 104 and 105. Weights 106 at the rear serve to counterbalance the mechanism mounted on the part of the apparatus which projects forward beyond the fore truck 104. Pneumatic cylinders 107 supplied with compressed air through the pipes 108 are used to advance the machine as the rock cutting progresses. The plungers 109 operating in the cylinders 107 carry a cross brace consisting of a central reversely threaded part 110 engaging end parts 111, which latter are slidably mounted in the ends of the plungers 109. At their outer ends the members 111 carry plates or other means for rigidly engaging the tunnel walls when the members 111 are forced outwardly by rotation of the central reversely screw threaded part 110. When the walls of the tunnel are gripped by outward pressure on the members 111 the cross brace 111—110—111 forms an abutment against which the plungers 109 act to advance the apparatus as the rock-cutting proceeds. The entire apparatus rides upon wheels 260 running upon rails 112 laid upon the bottom of the cut, the rails being advanced from time to time to keep pace with the advance of the apparatus.

Figure 3:
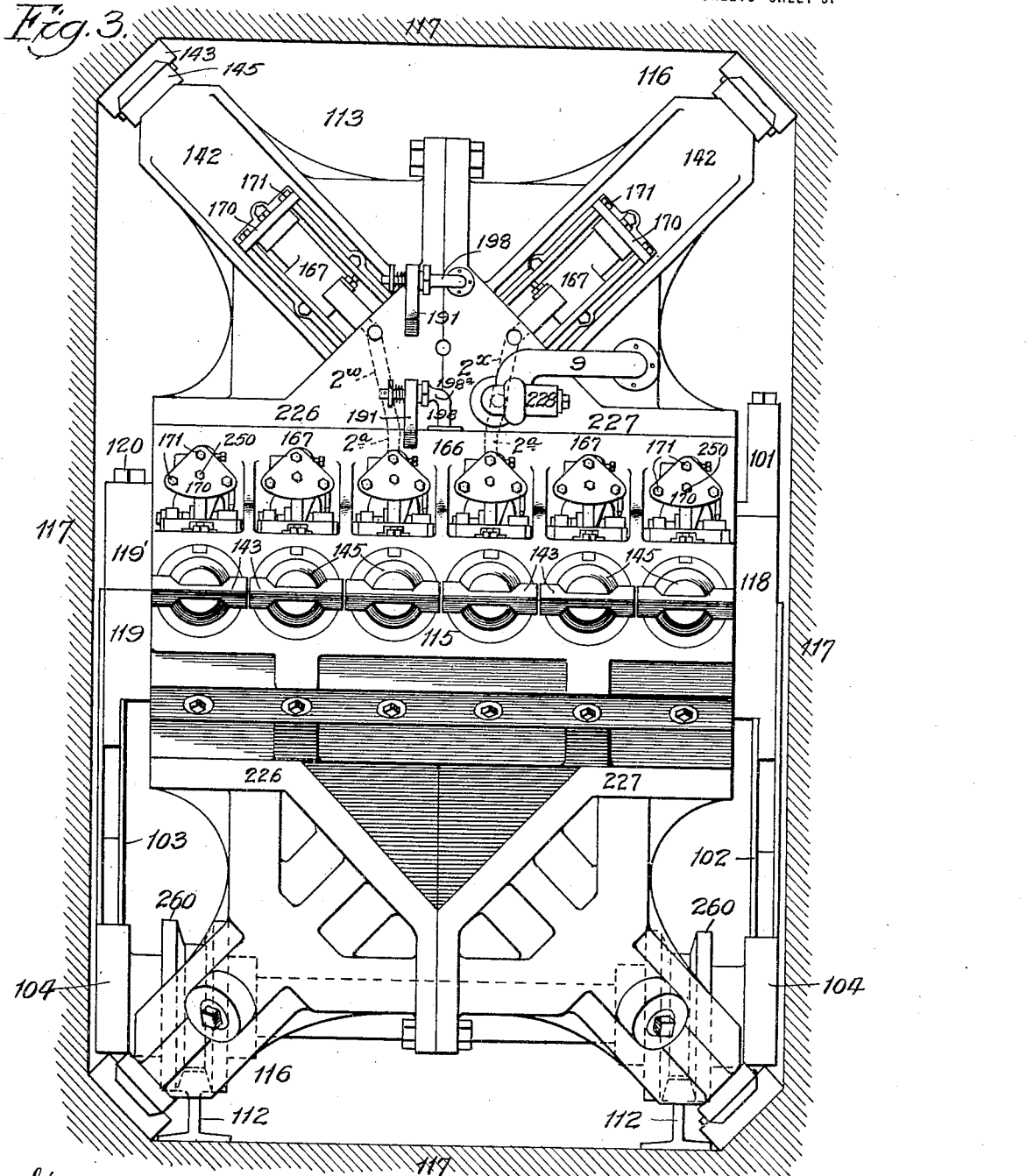
Fig. 3 is a front elevation of the apparatus.
Figure 4:
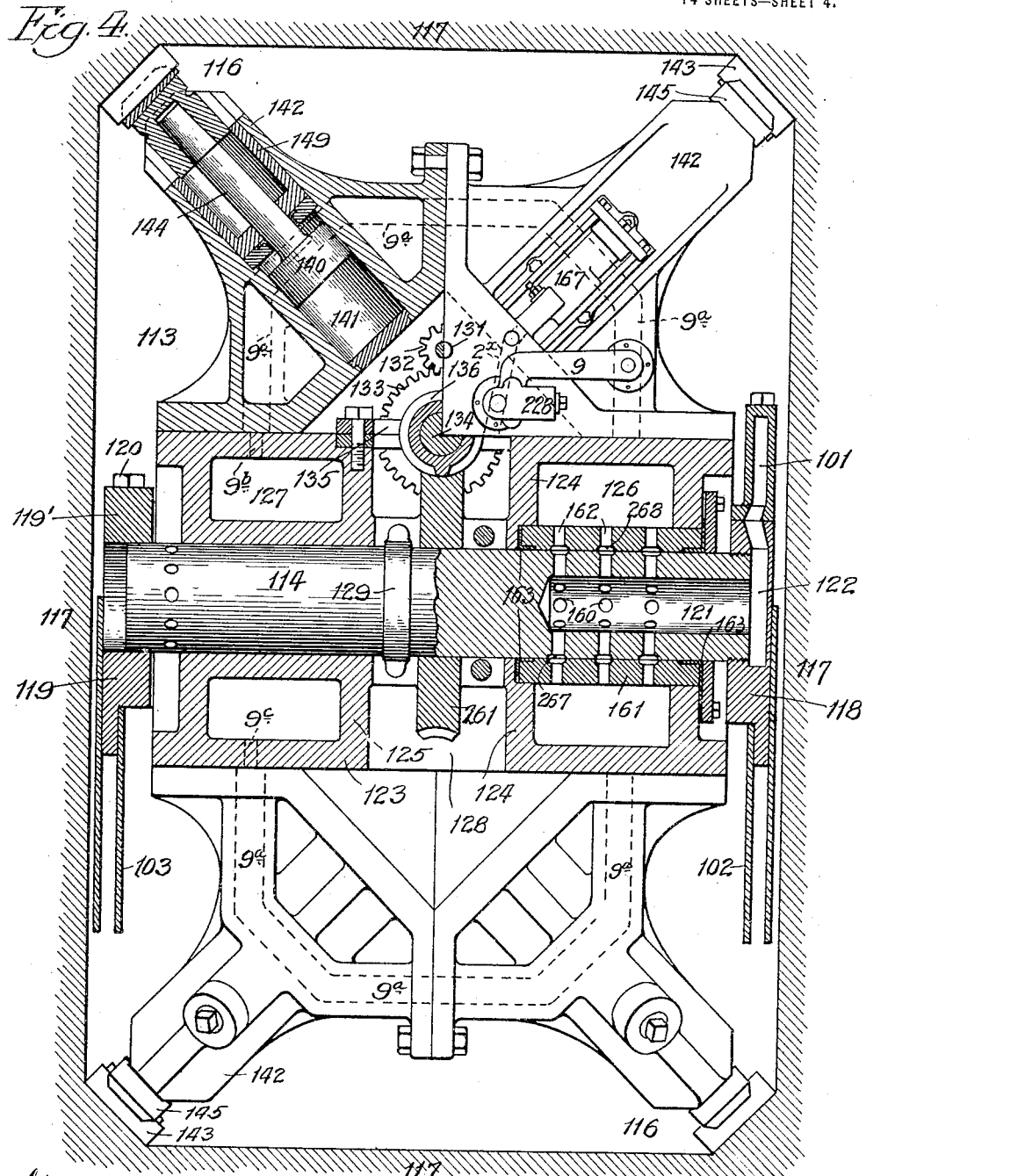
Fig. 4 is a front elevation similar to Fig. 3, certain parts being shown in section.

The rock cutting part of the apparatus comprises a revoluble head designated generally by the numeral 113 upon Figs. 1 to 5. The revoluble head rotates upon a stationary axis 114 mounted at its ends upon the forward end of the main body of the apparatus. The revoluble head 113 carries a plurality of radiating cutters arranged in several series or banks. In the present instance I have shown two series of cutters designated generally by the numeral 115 designed to reciprocate in lines normal to the axis of the revoluble head, and two series of cutters designated generally by the numeral 116 designed to reciprocate in lines inclined to the revoluble head of the apparatus. For the sake of brevity I will herein term the two series of cutters as corner cutters and angle cutters, the latter being designed to form inclined corner continuations of the cut made by the straight cutters. It will be apparent that as the head rotates in the direction indicated by the arrows in Fig. 1, the reciprocating cutters will form a cut or tunnel having a substantially semi-cylindrical face corresponding to the forward part of the circular path of movement of the cutting indicated in Fig. 1, and that, due to the action of the corner cutters in conjunction with the straight cutters the cross sectional form of the rock cut will be as indicated in Figs. 3 and 4, wherein the outer shaded area 117 represents the rock through which the cut is made.

Power for operating the rotating head and cutters carried thereby is supplied in the form of compressed air which is conducted to the forward part of the machine through a valved pipe 100 which connects with a conduit 101, the latter being flattened at its forward end as indicated in Fig. 2 for the purpose of compactness. The forward end of the conduit 101 appears at the right hand of Figs. 3 and 4, the latter view showing the conduit in section.

The stationary shaft 114 upon which the rotating head is mounted is screw-threaded into a supporting block 118 carried by the side plates 102 of the apparatus. At its opposite end the shaft 114 rests in the supporting block 119 carried by the side plates 103. The upper half 119' of the supporting block 119 is removably held in place by bolts 120 in order to facilitate assemblage. The end of the shaft 114 adjacent the compressed air conduit 101 is bored out centrally to form an axial chamber 121 which opens into a chamber 122 in the block 118, which latter chamber communicates with the compressed air duct in the conduit 101, thus affording a path for compressed air from the pipe 100 to the chamber 121 in the interior of the shaft 114. The central part of the revolving head 113 consists of a casing designated generally by the numeral 123, this casing being substantially square in longitudinal vertical section, that is, a vertical section longitudinal of the apparatus as an entirety.

The central casing 123 is divided into three parts by partitions 124 and 125 forming end chambers 126 and 127, which are wholly inclosed for the purpose of retaining air under different degrees of pressure. The central compartment 128 is open upon two opposite sides, as appears in Fig. 4, and inclosed upon the other two sides, as shown in Fig. 5.

Figure 5:
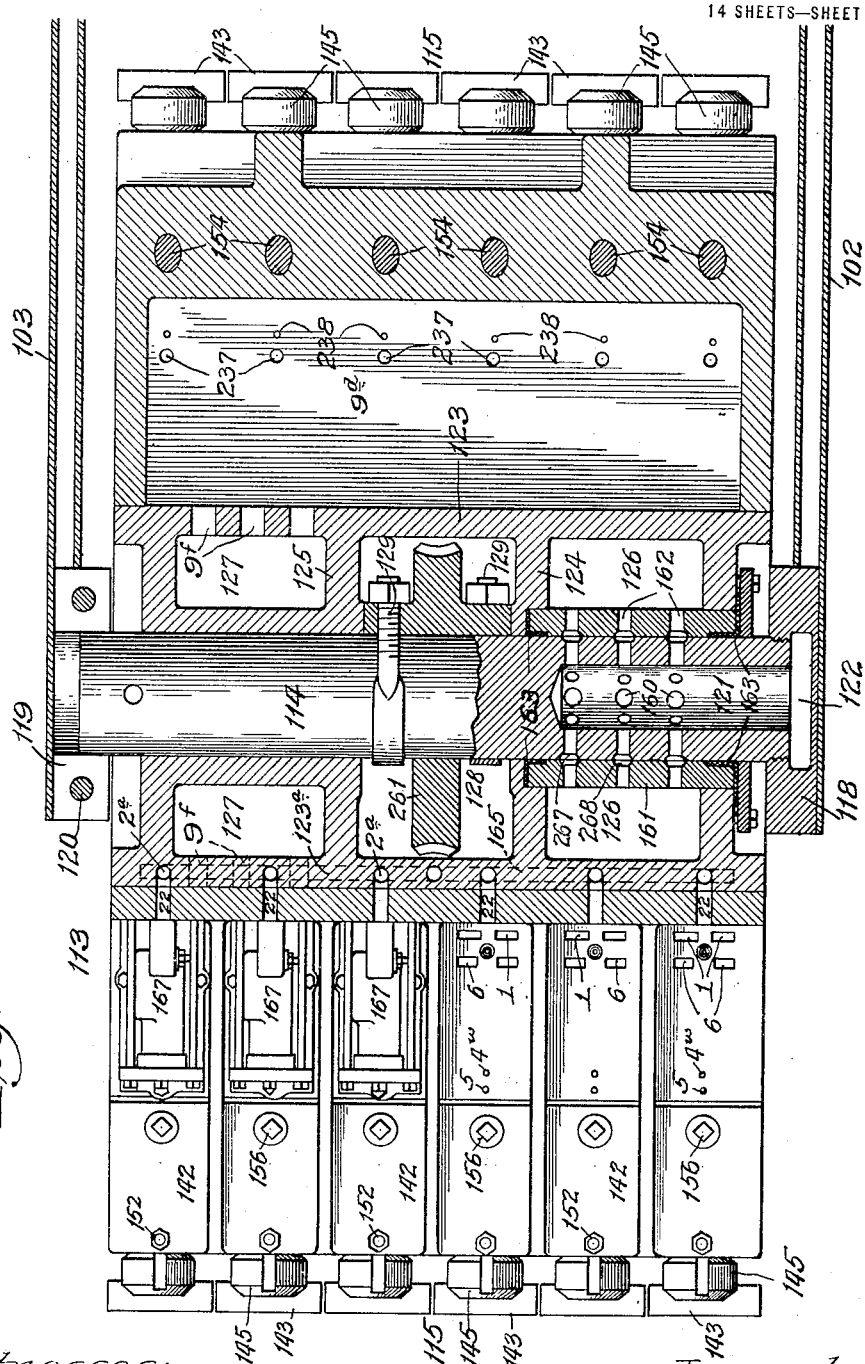
Fig. 5 is a plan view of the forward part of the machine showing the rotative head.

A worm wheel 261 is secured to the central part of the shaft 114 within the space 128 by means of two U-bolts 129 as clearly shown in Figs. 4 and 5 and 26, and it is through motor propelled gearing carried by the rotative head and acting upon the stationary worm wheel 261, that the head is given its rotative movement. Motive power for rotating the head 113 is preferably supplied by an air motor 130 mounted upon the rotative head, as indicated in Fig. 2. The main shaft 131 of the motor is supported at one end in the cylinder castings of two of the corner cutters, as indicated in Figs. 3 and 4, and at the other end in a plate 263 shown in Fig. 2 secured to the opposite side of the corner cylinder castings. Upon the motor shaft 131, as shown in Fig. 4, and in detail in Fig. 26, there is mounted a pinion 132 which meshes with the spur wheel 133 mounted upon a shaft 134 carried in bearings 135 secured to the central casing 123 of the rotative head, as shown in Fig. 4. A worm thread 136 is mounted or formed upon the shaft 134 and meshes with the worm wheel 261. Compressed air may be supplied to the air motor 130 from the chamber 126, or from any of the compressed air ducts in the rotative head.

It will be apparent from the foregoing that as the worm wheel 261 is stationary and meshes with the motor driven worm 136 carried by the rotative head efficient means are provided by rotation of the worm for imparting rotative movement to the main head 113. In order to adjust the speed of the rotative head 113 to the rate desired, such gearing as is necessary may be employed between the shaft 131 of the air motor and the worm 136. In the present instance I have shown reduction of the air motor speed by means of the pinion 132 and 133 and further reduction, of course, through the worm thread 136 and worm wheel 128.

Proceeding now to the structure of the cutters and the means for actuating them. The cutters are operated by fluid pressure in the cylinders 141 acting upon the pistons 140, the construction and operation of all of the cutters being the same. At the forward end of each of the cylinders 141 there is an axially projecting cutter guide 142, in this structure shown, see Fig. 6, as an integral part of the cylinder. The cutters 143 take the form of triangular prisms, preferably equilateral in cross section and having three cutting edges that may be used in turn. Mounted upon the outer end of the piston rod 144 of the piston 140 is a cutter holder 145 provided upon its outer side with an under-cut groove 146, the sides of which have the same inclination as the sides of the cutters 143.

In assemblage the cutter 143 is slid endwise into the groove 146, after which it is secured in position by means of a wedge 147 driven between the base of the cutter and the bottom of the groove 146. As clearly shown in Fig. 5, the cutters 143 project at their ends beyond the cutter holders 145 sufficiently to form a substantially continuous cutting edge.

The outer end of the piston rod 144 is tapered and fits into a tapered recess 148 in the base of the cutter holder 145, the tapered fit of these parts securing them together for service and at the same time facilitating removal of the cutter holders from the piston rods when necessary for renewal of the cutters or other purpose.

Fitting the interior of the cutter guide 142 is a cutter holder bushing 149 centrally bored to receive and guide the movement of the cutter holder 145. Each cutter holder is provided with means for preventing its rotation in the cutter holder bushing, this means in the form of construction illustrated consisting of a longitudinal groove 150 in the side of the cutter holder engaged by a block or a key 151 secured to the cutter guide and cutter holder bushing by means of a bolt 152.

The cutter holder bushing 149 is formed with a closed inner end formed with a notch 153. A screw plug 154 threaded into the cutter guide engages the notch 153 in such manner as to securely hold the cutter holder bushing in place. It will be observed that the screw plug 154 inclines inwardly toward the axis of the cylinder and cutter holder bushing and at its inner end abuts against the side of the notch 153 which is perpendicular to the axis of the screw plug. By this means a single screw plug is effective to hold the cutter holder bushing in place and the screw plug is easily accessible for assemblage or removal from the outer face of the cutter. An opening 155 is formed through the side of the cutter guide 142, said opening being closed by a removable screw plug 156.

A registering opening 157 is formed through the side of the cutter holder bushing opposite the opening 155 in the cutter guide, the opening 157 extending outward beyond the solid base of the cutter holder bushing 149, and inward to the outer head 265 of the cutter cylinder 141.

When it is necessary to remove one of the cutter holders from its piston rod the screw plug 156 is removed and a bar or block inserted through the openings 155 and 157 with its end projecting over the solid base of the cutter holding bushing 149. Then by manually operated means hereinafter to be described, the piston 140, together with the connected cutter holder, is given an inward reciprocation thereby bringing the inner surface of the cutter holder 145 into forcible contact with the inserted bar or block. The outward blow thus imposed upon the cutter head drives it off from the piston rod. This arrangement affords convenient and simple power operated means for removing the cutter holders from the piston rods upon which they are mounted.

From the foregoing description it will be apparent that in case it becomes necessary to renew a cutter this object may be accomplished in any one of several ways. Any cutter may be released by simply driving the wedge 147 out of its seat beneath the cutter, thereby releasing the cutter and permitting the cutter to be turned to present a new cutting edge or a new cutter to be inserted; or the cutter holder, together with its cutter, may be removed from the piston rod by inserting a block through the openings 155 and 157 and imparting an inward movement to the cutter holder and piston upon which it is mounted, or if desired, the screw plug 154 may be removed and a complete unit consisting of the cutter holder bushing, cutter holder and cutter may be removed after the cutter holder has been loosened from the end of the piston rod as above described.

The valve mechanism for operating and controlling the cutters is shown in enlarged vertical longitudinal section in Fig. 7. Generally speaking the valve mechanism consists of two parts more or less distinct in structure, but coöperating in their functions. The first part of the valve mechanism is that whereby admission and exhaust of compressed air to the outer cylinder 141 is controlled and the second part comprises pneumatically operated mechanism for automatically adjusting the power supplied to each cutter in proportion to the resistance encountered thereby. Owing to the inequality of the material in which the apparatus may be used it is necessary to provide means whereby the power supplied to any individual cutter or cutters which happen to encounter soft material will be reduced, while a full supply of power will be maintained to operate those of the cutters which encounter harder and more resistant material. The provision of automatically actuated means for accomplishing this result is one of the important features of my invention.

Before describing the complete arrangement of the various conduits whereby compressed air is conducted to all of the cutters, I will describe the action of an individual cutter and its valve mechanism, referring for the time being to the various air conduits only in so far as necessary to render clear the explanation of the action of one of the cutters.

As above indicated, compressed fluid, preferably air, is admitted to the axial bore 121 of the stationary shaft 114 of the rotative head, the arrangement of this part of the mechanism being clearly shown in Figs. 4, 5, and 6. Radiating from the center bore 121 of the main shaft 114 are a series of radial openings 160 extending from the radial bore 121 to the exterior of the shaft 114 and opening into an annular groove 267 upon the exterior of shaft 114. Fixed to the interior of the central casing 123 of the rotative head opposite the axial bore 121 in the shaft 114 is a bushing 161, which bushing is provided with radial openings 162, opening into an annular groove 268 upon the interior of the bushing, the grooves 267 and 268 being in registry to establish continuous communication between radial openings 160 and 162. Angular gaskets 163 form a fluid tight joint between the rotative head and the shaft 114. The radial openings 160, 162 together with annular grooves 267 and 268 form ducts for the passage of compressed air from the bore 121 to the chamber 126 at one end of the rotative head.

In the interior of the wall 123$^a$ of the central casing 123 of the rotative head 113 is a duct 165, as clearly shown in Figs. 6 and 7. This duct extends across the face of the head in order to afford communication with all of the series of straight cutters. The arrangement for both of the banks of straight cutters is the same. The duct 165 is connected with the chamber 126 by a duct 2 shown in Figs. 6 and 7. Extending from the duct 165 opposite each of the cutters is a duct 2$^a$ which extends upwardly, in the position of the parts shown in Fig. 7, from the duct 165 and then extends at an angle to the outer surface of the side 123$^a$ of the central casing 123 of the rotative head.

As shown most clearly in Fig. 6, the tool cylinder casting comprises the tool cylinder proper containing the tool piston 140, the outwardly extending cutter guide 142 and a flange 166 which lies against the outer surface of the side 123$^a$ of the central casing 123 of the rotative head. The valve mechanism for the operation of the cutters is contained in a valve casing designated generally by the numeral 167. This valve casing fits in the angle formed between the side of the cylinder 141 and its end flange 166, the same being shown in longitudinal section in Figs. 6 and 7. The valve casing 167 takes different cross sectional forms at different ducts which are formed in the walls thereof. The different cross sectional forms of the valve casing are illustrated in Figs. 8 to 15, reference to which views in connection with the longitudinal sections 6 and 7 will be had in the explanation of the valve mechanism.

The operation of the valve mechanism centers about two cylinders, the control cylinder 168 at the upper part thereof, and a differential cylinder 169 in the lower part of the valve casing, the cylinders 168 and 169 being designated by those numerals upon Fig. 6. The cylinder 168 is provided at its outer end with a removable head 170 secured in place by bolts 171. The cylinder 169 is closed by the flange 166 of the cutting cylinder when the valve casing is placed in position, as shown in Fig. 6. The bore of the differential cylinder 169 is formed in a cylinder bushing 172 fitted to a cylindrical opening in the main body of the valve casing 167, the large bore 169$^a$ of the differential cylinder being at the left and the small bore 169$^b$ being at the right as viewed in Figs. 6 and 7. Fitted to and operating in the differential cylinder is a differential piston having a large head 172$^a$ operating in the large part of the cylinder and a small head 172$^b$ operating in the small part of the differential cylinder. The differential piston 172 is hollow and so formed as to divide the space within the differential cylinder into three chambers—(1) a high pressure chamber 173 in the interior of the small part of the hollow piston; (2) an exhaust chamber 174 between the large and small parts of the piston and surrounding the stem which connects the large and small parts; and (3) the space 175 between the large part of the piston and the end of the cylinder. The small part of the hollow cylinder is open at its end and hence the high pressure space in the interior of the small part of the piston is continuous with the space inside of the small part of the cylinder when the piston is moved toward the large end of the cylinder, in which position the high pressure chamber includes not only the interior of the small part of the piston, but the adjoining space in the small part of the cylinder wherein it moves.

A duct 22 through the flange 166 of the tool cylinder 141 registers with the duct $2^a$ in the side $123^a$ of the central casing of the rotative head and affords communication with a passage $2^b$ formed in the adjoining part of the valve casing 167. A cylindrical opening 179 extends from the end of the cylinder 168 and is connected by a short cross passage $2^c$ with the duct $2^b$ in the valve casting. Fitted within the cylindrical opening 179 is a throttle valve bushing 180, which is slotted in its opposite sides in registry with the short cross passage $2^c$, the slots or parts in the opposite sides of the throttle valve bushing being designated $2^d$ and $2^e$.

The piston rod 182 of the central piston 183 operates as a throttle valve in the throttle bushing 180. Registering with the lower port $2^e$ of the throttle valve is a duct $2^f$—$2^g$ through the valve casing and leading to an annular groove $2^h$ extending around the exterior of the differential cylinder bushing 172. Upon the interior of the differential cylinder bushing 172 opposite the annular groove $2^h$ is an annular groove $2^k$, and the grooves $2^h$ and $2^k$ are connected by a plurality of radial passages $2^i$. Extending through the small part of the differential piston 50 are a series of radial passages $2^l$, which in all positions of the differential piston register with the annular groove $2^k$ upon the interior of the differential valve bushing 172.

In the body of the valve casing and surrounding the differential valve bushing is a duct $1^a$ of the general form shown in Figs. 7 and 8. The duct $1^a$ communicates with radial ducts $1^b$ extending through the differential valve bushing 172, which ducts $1^b$ open into an annular groove $1^c$ upon the interior of the differential valve bushing 172. The duct $1^a$ in the valve casing communicates with ducts 1 in the wall of the cylinder 141, the ducts 1 opening into said cylinder and forming the high pressure admission ports. The extent of movement of the differential cylinder valve is such that when the valve is moved to the left from the position illustrated in Fig. 7, the groove $1^c$ will be uncovered, thus opening communication between the interior of the small part of the differential piston and the tool cylinder 141, and when the differential piston is so moved to the left air under pressure will be admitted from the high pressure chamber 126 through the passages 2, 165, $2^a$, 22, $2^b$, $2^c$, $2^d$, $2^e$, $2^f$, $2^g$, the annular groove $2^h$, the radial passages $2^i$, the annular groove $2^k$, the radial passages $2^l$, to the interior of the small part of the differential piston, thence to the groove $1^c$, through the openings $1^b$, to the space $1^a$, and through the ports 1 to the tool cylinder. It will be noted that the high pressure fluid in the course of its passage to the interior of the tool cylinder first passes through the interior of the small part of the differential piston, thence around the end thereof through the openings $1^b$ which communicate with the admission ports 1.

The differential piston 172 is constantly impelled to the left from the position illustrated in Fig. 7 by the high pressure fluid constantly maintained upon the right side of, that is, within, the small part of the differential piston, such high pressure being constantly maintained, as above indicated, by the fact that the openings $2^l$ in the small part of the differential piston register in all positions with the groove $2^k$ in the differential cylinder bushing 172.

For moving the differential piston to the position illustrated in Fig. 7, the following means are provided: A small duct 3 leads transversely from the high pressure fluid passage $2^b$, as illustrated in Figs. 7 and 9, and is continued in a longitudinal direction, as indicated by the part designated by the numeral $3^a$, shown in Figs. 7 and 9, and is thence continued downwardly and opens into the large end of the differential cylinder, as indicated by the numeral $3^b$ in Figs. 7 and 10. The passage of high pressure fluid through the duct 3—$3^a$—$3^b$ to the large end of the differential cylinder is controlled by a needle valve 186 which coöperates with a seat formed at the end of the passage 3. The stem of the needle valve 186 is threaded, for adjustability, into the side of the valve casing opposite the opening of the passage 3, as indicated in Fig. 9, and a locknut 187 is provided for the purpose of holding the needle valve in adjustment.

Figure 1:
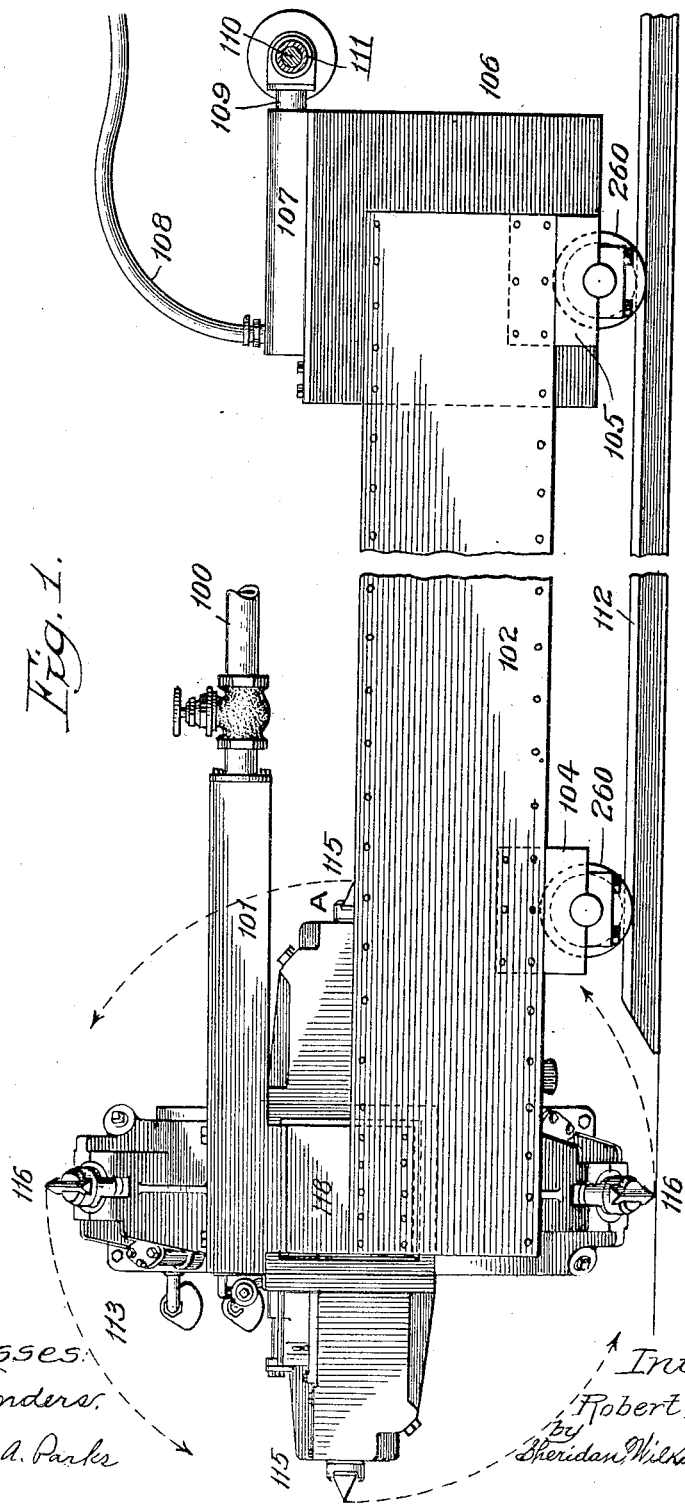
Figure 1 is a side elevation of the entire machine.

Also opening into the large end of the differential cylinder is a vent duct $3^c$ clearly shown in Figs. 7 and 11, which extends longitudinally a short distance where it connects with a vertical passage $3^d$, which in turn connects with a valved passage $3^f$—$3^i$, which extends to a cross duct $3^j$. The cross duct $3^j$ extends across the entire series of straight cutters, and the vent passages of each of the straight cutters of the series open into it. At some convenient point a passage 189 extends upwardly from the passage $3^j$ to the top edge of the base flange 166 of the tool cylinder 141, this passage being shown in Fig. 5 as at the center of the flange. Connecting with the passage 189 is a pipe 198 which extends upwardly and outwardly, as indicated in Fig. 6, and at its upper end has a part $198^a$ extending substantially parallel to the axis of the rotative head, as indicated in Figs. 1 and 3.

Connected to the end of the pipe $198^a$, as shown in detail in Fig. 23, by a screw collar, is a conical valve plug 194 upon which is mounted a conical gravity valve 191, shown in sectional detail in Fig. 24, the lower part of which serves as a weight to cause the gravity valve to constantly hang in the vertical position illustrated, regardless of the position assumed by the rotative head in its movement. The conical valve plug 194 has a central axial recess 200 connected to the exterior of the plug by a slot 201. The gravity valve 191 is provided adjacent its upper apex with a conical opening in which the valve plug 194 is seated, and communicating with the conical opening in the gravity valve 191 is a chamber 192 extending through substantially a semi-circle and forming an offset from the conical opening. The chamber 192 communicates through an opening 190 with the atmosphere. The gravity valve 191 is held to its seat upon the conical plug 194 by means of a spring 195 abutting at one end against a washer 196 held upon the stem of the conical plug 194 by a pin 197.

From the foregoing it will be apparent that the interior 200 of the conical plug 194 will be in communication with the atmosphere during half of each revolution of the rotative head 113—this by reason of the fact that the conical plug 194 is fixed to and rotates with the head, while the gravity valve turns upon the plug 194 by reason of the fact that it is always maintained in a vertical position by the force of gravity. As illustrated in Figs. 23 and 24, the gravity valve is in its middle position with the slot 201 of the valve plug closed and midway between the ends of the chamber 192. This is the position occupied by the gravity valve relative to the valve plug governing the series of cutters occupying a rearward horizontal position, as illustrated in Fig. 1, the position of the rearward horizontal cutters being designated by the letter A. It will be evident that when the rearward straight cutters A illustrated in Fig. 1 have turned through a quarter of a revolution bringing them to an upward vertical position, the gravity valve 191 will open the vent, which ends in the conical plug 194, to the atmosphere and that the vent will remain open until the head has turned through a semi-revolution bringing the series of straight cutters referred to to a vertically downward position, and that at that point the gravity valve 191 will again close the vent and maintain it closed while the straight cutters of the series referred to are moving through the semi-revolution in which they are not opposed to the face of the rock cut. All of the cutters of the apparatus are similarly provided with gravity valves, whereby vents corresponding to the one above described in detail are maintained closed during the idle semi-revolution of the cutters, and are maintained open during the semi-revolution when the cutters are opposed to the rock face.

The vent passages $3^c$, $3^d$, $3^f$, $3^i$, $3^j$, 189—198—200—201—192—190 are governed not only by the gravity valve above described, but also by means of hand valves 205 illustrated most clearly in Figs. 7, and 11 to 14 inclusive. The hand valve 205 is capable of three functions. When turned to the position shown in Fig. 7 a passage $3^e$ through the plug of the hand valve maintains the continuity of the vent passage. When the valve is turned 90 degrees clockwise from the position shown in Fig. 7, the vent passage is closed at the hand valve; the large end of the differential cylinder at such time having no communication either with the atmosphere or with the part of the vent passage beyond the hand valve. The hand vent valve is provided in its outer surface with a groove 206 whereby when the vent valve is turned about 45 degrees counterclockwise from the position shown in Fig. 7, the large end of the differential cylinder is connected through the passage $3^c$—$3^d$ and the groove 206 with the atmosphere, thereby preventing any accumulation of pressure in the large end of the differential cylinder so long as the hand valve is maintained in the last described position.

The vent passage is further controlled at a point between the parts thereof designated $3^f$ and $3^i$ by means of a tappet valve 207, illustrated in Fig. 7, and in detail in Figs. 18, 19 and 20. The conical seat of the tappet valve is formed in a bushing 208 set in a recess in the lower side of the valve casing and the conical valve 207 is normally maintained upon its seat by means of a spiral spring 209. The part $3^f$ of the vent passage connects with a chamber 210 above the valve seat and the part $3^i$ of the vent passage connects with a space 211 below the valve seat. Seated in a bushing 212, which is fitted to a recess in the wall of the tool cylinder 141, is a ball tappet 213 held in place by the restricted lower end of the opening in bushing 212. A pin 214 is slidably seated in a plug 215 which closes the upper end of the opening in the bushing 212, and the lower end of the pin 214 engages the tappet ball 213, the latter normally projecting a short distance inside of the inner surface of the bore of the tool cylinder 141 where it lies in the path of the tool piston 140. It will be apparent that upon its backward stroke the tool piston 140 will contact with the tappet ball 213 and push it outward, which outward movement will be communicated to the pin 214 and from the pin to the tappet valve 207, thereby raising the latter from its seat and opening communication between the parts $3^f$ and $3^i$ of the vent passage. Upon the forward stroke of the piston the tappet valve 207 will be seated by the spring 209 and close the vent passage as soon as the tool piston 140 has moved forward beyond the tappet ball 213.

The exhaust of compressed fluid from the tool cylinder is effected through an exhaust port 6 shown in Figs. 7 and 8ª. The exhaust passage 6 extends upwardly as shown in Figs. 7 and 8ª through the wall of the tool cylinder 141, thence is continued as the duct 6ª in an upward direction through the lower part of the valve casing The exterior of the differential valve bushing 172 is preferably surrounded by the continuation 6ª of the exhaust duct, as indicated in Figs. 7 and 8ª. The differential valve bushing is provided with an annular series of radial openings 6ᵇ which establish communication between the parts 6ª of the exhaust duct and the interior of the central chamber 174 of the differential valve bushing. The radial openings 6ᵇ in the differential valve bushing open into an annular groove 217 upon the inner side of the bushing. The small part 172ᵇ of the differential piston operates to open and close the exhaust by moving to and fro across the face of the annular groove 217. As indicated in Figs. 7 and 15, the differential valve bushing is provided with another series of radial openings 6ᶜ which establish communication between the interior of the bushing and an annular chamber 6ᵈ formed in the body of the valve casing around the exterior of the differential valve bushing. The space 6ᵈ surrounding the differential valve bushing communicates with the recess 6ᵉ formed in the bottom of the valve casing, shown in Figs. 7 and 10 to 14, through which latter space communication is established with the openings 6ᶠ extending through the cutter guide and with opening 157 in the cutter holder bushing and into the interior thereof. Openings 6ᵍ extending through the cutter holders give communication from the exhaust passages described to the atmosphere.

In operation the parts have assumed the positions illustrated in Figs. 6 and 7 by reason of the fact that high pressure fluid passing from the chamber 126 of the central part of the rotative head through the passages 2—165—2ª—22 and 2ᵇ to the small needle valve controlled duct 3 and thence through the passage 3, 3ª and 3ᵇ to the chamber 175 of the differential cylinder has created such pressure in the chamber 175 upon the large head 172ª of the differential piston as to overcome the high fluid pressure upon the opposing small head 172ᵇ of the differential piston. The differential piston has therefore been moved to the position shown in Fig. 7 by the preponderating force due to the high pressure fluid acting upon the large surface 172ª. The point of time at which the differential piston begins its movement toward the right to the position shown in Fig. 7 and the rapidity of its movement in that direction are dependent upon the adjustment of the needle valve 186, which controls the restricted duct 3, the needle valve being shown in detail in Fig. 9.

When the differential piston 50 occupies the position illustrated in Figs. 6 and 7, the exhaust port formed by the interior annular groove 217 in the differential valve bushing, is uncovered and fluid exhausts from the rear end of the tool cylinder 141 through the port 6 and passages 6ª, 6ᵇ to the interior of the central chamber 174 of the differential cylinder, thence through the passages 6ᵈ, 6ᵉ, 6ᶠ to the interior of the cutter guide 142, and cutter holder bushing 149, thence outward through the perforations 6ᵍ formed in the cutter holder 145.

The passage of the exhaust fluid through the perforations 6ᵍ serves to prevent the entrance of rock cuttings or other foreign material into the interior of the cutter holder bushing 149 and thereby keeps the mechanism free from interference by accumulations of foreign matter. In order to maintain a constant outward flow of exhaust fluid through the perforations 6ᵍ, as distinguished from an intermittent flow, which would result if exhaust fluid were supplied to the perforations 6ᵍ of each individual cutter tool from the single cylinder which operates that cutter, I provide a chamber or cross passage 221 which extends across the cutter guide 142 connecting the interiors of all of the cutter holder bushings of the series. By this means a constant supply of exhaust fluid is maintained at each of the cutter heads by reason of the fact that at all times some of the cutter cylinders will be exhausting into the passage 221 from which it will flow into all of the cutter guides of the series.

When the cutter piston 140 has moved to the right from the position illustrated in Fig. 7 by reason of the low pressure fluid supply constantly maintained at the left of the piston 140, as hereinafter described, the exhaust port 6 will be covered and closed by the tool piston 140, thereby entrapping in the right-hand or rear end of the tool cylinder 141 sufficient air to cushion the rearward stroke thereof. Immediately after covering and closing the exhaust port 6 in its movement to the right, the tool piston 140 will contact with and raise the tappet ball 213. The upward movement of the tappet ball 213 will raise the pin 214, which in turn will contact with the automatic vent valve 207 and raise the same against the force of the spring 209, it being understood that all this time the hand vent valve 205 is in the position illustrated in Fig. 7, and that the gravity valve 191, shown in detail in Figs. 23 and 24, is in such position as to establish communication between the interior of the vent passage and the atmosphere. Under these conditions the raising of the automatic vent valve 207 permits the high pressure fluid, which had previously accumulated in the space or chamber 175 at the left of the differential cylinder, to escape through the vent passage 3$^c$—3$^d$—3$^e$—3$^f$—210—211 (210 and 211 being the passages around the automatic vent valve shown in Fig. 18) 3$^i$, 3$^j$, 189 to the pipe 198 shown in Fig. 23 and outward to the atmosphere through the passages 200 and 201 in the valve plug 194, and through the chamber 192 and outlet duct 190. This operation has the effect of reducing the pressure in the chamber 175 at the left of the differential cylinder to substantially atmospheric pressure, the inflow of high pressure fluid through the needle valve controlled duct 3 being so restricted as to prevent the building up of sufficient pressure in the chamber 175 of the differential cylinder while the vent 3$^c$—3$^d$, etc., is open to resist the high pressure maintained upon the opposing side of the differential piston.

High pressure is constantly maintained upon the small head 172 of the differential piston by means of the free passage of high pressure fluid at all times from the chamber 126 of the central casing of the rotative head through the passages 2—165—2$^a$ etc., through the throttle valve and connecting passages to the perforations 2$^l$ in the small part of the differential piston, the perforations 2$^l$ being in all positions of the differential piston in communication with the interior annular groove 2$^k$ of the differential valve bushing.

It will be apparent, therefore, that the lifting of the tappet ball 213 and opening of the automatic vent valve 207 has the effect of discharging pressure from the chamber 175 at the left of the differential piston, thereby enabling the constantly maintained high pressure in the chamber 173 of the differential valve acting upon the small head of the differential piston to move the differential piston to the left, as viewed in Fig. 7. The movement of the differential piston valve to the left has the effect first of closing the exhaust port formed by the groove 217 upon the interior of the differential valve bushing 172 and the connecting passages, and then opens the high pressure admission port formed by the groove 1$^c$ in the differential valve bushing and connecting passages. The differential valve and related parts may be so proportioned that the opening of the high pressure admission port 1$^c$ will take place at substantially the moment when the movement of the tool piston 140 to the right has compressed the air entrapped after the closing of the exhaust port 6 to substantially the same pressure as that of the in-coming high pressure fluid, thereby avoiding any waste of pressure fluid due to admitting it into the cylinder at a time when the pressure therein is below the line pressure of high pressure fluid.

The admission of high pressure fluid through the port 1 as above described forces the tool piston 140 to the left as viewed in Fig. 7. In an early part of its movement the piston 140 will pass from beneath the tappet ball 213, thereby permitting the automatic vent valve 207 to close under pressure of its spring 209. The closing of the automatic vent valve 207 prevents further escape of pressure fluid from the chamber 175 at the left of the differential cylinder and thereby leads to the building up of fluid pressure in that chamber, the pressure being built up more or less rapidly according to the adjustment of the needle valve 186 controlling the duct 3 and connecting passages leading to the chamber 175. By proper adjustment of the needle valve the time at which sufficient pressure will be created in the chamber 175 to move the differential piston valve again to the right may be so adjusted as to cut off the supply of high pressure fluid through the port 1 at any desired time in the forward stroke of the tool piston 140, thus utilizing expansion of the high pressure fluid to such degree as desirable for effectuating the movement of the tool piston, or, if desired, maintaining high pressure upon the tool piston throughout its stroke without expansion of high pressure fluid in the tool cylinder 141. In other words, the needle valve 186 may be utilized to adjust the point of cut off. The movement of the differential piston to the right-hand position illustrated in Fig. 7 is then again accomplished as above described in explaining the operation which brought the valve to the position illustrated.

The two high pressure ducts 2$^a$ adjacent the center of the series of straight cutters are continued upwardly, as indicated in Fig. 7, and in dotted lines in Figs. 3 and 4, into the corner cutter cylinder castings 226 and 227 upon which the corner or angle cutters are mounted. The continuations of the two central ducts 2$^a$ into the corner cylinder castings 226 and 227 are designated 2$^x$ and 2$^w$ upon Figs. 3 and 4. The ducts 2$^x$ and 2$^w$ and similar ducts upon the opposite side of the machine for the two opposite corner or angle cutters supply high pressure fluid to the corner cutters, the construction of the corner cutters and the actuating mechanism therefor being the same as that of the straight cutter above described. Upon the corner cylinder casting 227 I mount a pressure reducing valve 228, as shown in Figs. 3 and 4, and in detail in Fig. 25. The duct 229 of the pressure reducing valve communicates with the duct $2^x$ which supplies the high pressure fluid to the upper right-hand corner cutter as viewed in Figs. 3 and 4. Seated in the casing of the pressure reducing valve 228 is a conical valve 230 impelled toward its seat by a spring 231. Perforations 232 through the sides of the hollow conical valve 230 admit fluid pressure to the inside or rear face of the valve 230. Fluid supplied to the apparatus and reaching the reducing valve through the passage 229 lifts the spring-impelled valve 230 permitting high pressure fluid to pass into the duct 9 until such fluid pressure is attained in the duct 9 and upon the low pressure side of the valve 230 as will, in combination with the force of the spring 231, equal the high fluid pressure maintained in the duct 229, the difference in pressure between the fluid maintained on the opposite sides of the valve 230 being equal to the pressure exerted by the spring 231. In this way fluid is constantly maintained in the duct 9 and connected passages at a pressure lower than the pressure of the fluid supplied to the machine by an amount determined by the strength of the spring 231.

The pressure of the air initially supplied to the machine, that is, the line pressure I frequently refer to herein as high pressure, and the relatively lower pressure maintained in the parts of the apparatus communicating with the duct 9 of the reducing valve I refer to as low pressure, it being understood, however, that the low pressure referred to is a pressure higher than that of the atmosphere. Low pressure air is transmitted from the duct 9 through the duct $9^a$ extending through corner cylinder castings 227 and 226, as indicated in dotted lines in Fig. 4, and through a passage $9^b$ shown in Fig. 4 low pressure fluid is conducted to the chamber 127 in the left-hand end of the central casing of the rotative head, as viewed in Fig. 4. Through a similar passage $9^c$ low pressure fluid is conducted from the chamber 127 to a passage $9^a$ extending through the cylinder castings of the other two angle cutters. Low pressure fluid is also conducted from the chamber 127 through passages $9^f$ shown in Fig. 5 to the low pressure chamber $9^d$ which, as shown in Figs. 5 and 6, extends through the cylinder casting in which the straight cutter cylinders are formed, the low pressure air chamber $9^d$ occupying a position adjacent each of the straight cutter cylinders as shown in Fig. 6. Similar passages $9^f$, indicated in dotted lines in Fig. 5, communicate with a similar low pressure chamber extending across the opposite straight cylinder casting and occupy a similar relation to the cylinders thereof.

The low pressure chamber $9^d$, as shown in Fig. 6, communicates through the duct 237 with the cutter cylinder 141 at a point adjacent to the outer end thereof, but spaced from the end sufficiently to form a cushion for the cutter piston 140. The low pressure chamber $9^d$ also communicates with the cutter cylinder 141 through a small duct 238 which opens into the cutter cylinder at its extreme outer end where it will under no conditions be covered and closed by the cutter piston 140. The duct 238 is provided with a check valve 239 opening toward the cutter cylinder, whereby low pressure air may pass into the outer end of the cutter cylinder, but passage of fluid in the opposite direction is prevented, thus providing low pressure upon the piston in its extreme outer position.

Also communicating with the cutter cylinder at its outer end is the duct 5, and a second duct $4^w$ is spaced at some distance from the outer end of the cylinder. The ducts 5 and $4^w$ and connecting parts are shown upon a larger scale in Fig. 7 than in Fig. 6, and hence the detail of these parts will be explained with reference to Fig. 7.

Located in the upper part of the valve casing 167 is a cylinder 168 closed at its outer end by a head 170. Operating in the cylinder 168 is a piston 183 having a piston rod 182 adapted to reciprocate in the throttle valve bushing 180, the piston rod 182 in effect forming the throttle valve. The throttle valve bushing 180 is shown in detail in Figs. 21 and 22. In its upper side the bushing is provided with an elongated opening $2^d$ and opposite this opening in the lower side of the bushing is an opening $2^e$, which at one end tapers, as indicated at 241, and ends in a substantially circular part 242. Fitted into the end of the throttle bushing 180 opposite the piston rod valve 182 is a plug 243 having a projecting shoulder 244 which acts as a stop to prevent the piston rod 182 from completely closing the throttle valve openings in the bushing 180. The stop shoulder 244 projects sufficiently to arrest the piston rod 182 at the end of the tapered portion 241 of the opening in the lower part of the throttle bushing, thereby preventing the small circular opening 242 from being closed under any conditions, it being understood, of course, that the stop shoulder 244 takes the form of a central projection around which high pressure fluid may pass from the opening $2^d$ through the center bore of the throttle bushing and thence through the circular opening 242 to the communicating ducts beyond. The duct 5 passing through the wall of the cutter cylinder 141 communicates with a duct $5^d$ in the valve casing through a check valve shown as screw-threaded into a counter bore at the bottom of the duct $5^d$. The ball 247 of the check valve rests upon a seat formed at the base of the passage through the body of the check valve and is held against the displacement by a pin 248. The check valve permits passage of fluid outward from the cylinder through the duct $5^a$, $5^b$ and $5^c$ to the duct $5^d$, and thence to the left hand or outer end of the cylinder 168, the duct $5^d$ opening into the cylinder 168 at a point adjacent the end thereof. The arrangement of the check valve and duct $5^d$ is clearly shown in Figs. 6, 7 and 13. The duct $4^w$ which opens from the cylinder 141 at a point more remote from the outer end thereof than the duct 5, and at a point substantially opposite the duct 237 leading from the low pressure chamber $9^d$ shown in Fig. 6, extends upwardly through the wall of the cutter cylinder, as shown in Figs. 7 and 12, and is continued as a duct $4^x$, extending upwardly through the valve casing to a point adjacent the control cylinder 168, thence longitudinally of the control cylinder, as shown in Figs. 7, 10, 11 and 12, to a point adjacent the inner or right-hand end thereof where the longitudinal duct $4^y$ opens into said control cylinder through a port $4^z$ indicated in Figs. 6, 7, 10, 11 and 12.

In order to permit equalization of pressure upon opposite sides of the control piston 183, said piston may be turned of slightly less diameter, say a thousandth of an inch, than the bore of the control cylinder 168, or other means, such as a small opening 249, may be formed through the control piston 183 for the same purpose. I prefer, however, to turn the piston slightly smaller than the bore of the cylinder, thus accomplishing the desired equalization and at the same time avoiding the necessity of forming a tight fitting piston. A set screw 250 threaded through the head 170 of the control cylinder forms means for adjusting the extent of movement of the control piston 183 and its throttle piston 182 to the left.

Owing to inequalities in the resistance of different parts of rock or other material being penetrated, rock cutting machines wherein all of the cutters act together under the same force and with the same degree of reciprocation are not satisfactory in practice by reason of the fact that those of the cutters which meet with little or no resistance operate idly, with consequent shock to the apparatus, which leads to loss of power, injurious effects upon the apparatus, and an unsatisfactory, if not wholly unsuccessful, attack upon the material in which cutting is attempted. As will be apparent from the foregoing, my improved apparatus comprises a plurality of individually actuated cutters mounted upon a revolving head and in order to prevent the evil results following the uniform supply of power to all of the cutters regardless of whether they meet like resistance or not, I have provided special means whereby each individual cutter is automatically supplied with the amount of power necessary to overcome the particular degree of resistance which it encounters, the operation of which will now be described.

In operation a constant low pressure, that is low relatively to the high line pressure supplied to the apparatus, is maintained upon the outer sides of all of the cutter pistons of the apparatus, it being understood, however, that this low pressure is a pressure higher than that of the atmosphere and is referred to as low pressure merely in contra-distinction to the high line pressure used to drive the cutter pistons outward upon their cutting stroke. Whenever any individual cutter by reason of encountering material easily penetrated moves outward such a distance that its piston 140 passes beyond and covers and closes the related low pressure duct 237 (Fig. 6), low pressure fluid will be entrapped in the outer end of the cutting cylinder and will serve as a cushion to arrest the cutter without shock; and in any event whatever the resistance encountered by or the extent of outward movement of the cutter, when the differential cylinder valve moves to its right-hand position, as viewed in Figs. 6 and 7 the low pressure in the inner end of the cutting cylinder will return the cutter piston to its rearward position. that is, will move it to the right as viewed in Figs. 6 and 7. Whenever the cutter piston 140 moves to the left, beyond the low pressure duct 237, the position of which duct is most clearly shown in Fig. 6, not only will the entrapped pressure fluid serve to cushion the stroke of the piston, but the entrapped fluid through the rise in pressure imposed upon it by the outward movement of the cutter piston 140 will so actuate the throttle valve as to decrease the supply of high pressure fluid to the right-hand end of the cutter cylinder upon the next succeeding stroke, thus preventing such a supply of high pressure fluid upon the succeeding stroke as to cause a continuation of the excess movement of the cutter due to its encountering soft material.

Under normal conditions equal pressure is maintained upon opposite sides of the control piston 183, this pressure being that of the low pressure fluid carried to the controller cylinder 168 upon opposite sides of the control piston 183 by the ducts 5—$5^d$ and $4^w$—$4^z$, such low pressure being equalized upon opposite faces of the controller piston 183 by the slight clearance 253 around the outer surface of the control piston or by the small opening 249 above referred to. A stroke of the cutter which carries the forward face of the cutter piston 140 to a point about opposite the low pressure fluid duct 237, shown in Fig. 6, being regarded as the normal cutting movement of the cutter, it will be apparent that an excess stroke of the cutter piston will cover and close the low pressure fluid duct 237 and also the opposite duct 4ʷ which carries low pressure fluid from the cutter cylinder to the right-hand end of the control cylinder 168. Further movement of the cutter piston 140 will compress the air entrapped in the left-hand end of the cutter cylinder and as the equalized pressure upon opposite sides of the controller piston 183 is that of the low pressure fluid supplied through the chamber 9ᵈ, it will be apparent that the higher pressure imposed upon the entrapped air at the left-hand end of the cutter cylinder 141 will raise the check valve 247 and create a flow of fluid into the left-hand end of the control cylinder, such fluid being under a higher pressure than that previously occupying both ends of that cylinder. Owing to the restricted communication between the opposite ends of the cylinder 168 through the clearance space 253 or bleed opening 249, the pressure in the opposite ends of cylinder 168 cannot be equalized instantly and the control piston 183 with its throttle piston 182 will be moved to the right, thus closing the throttle valve to a greater or less extent according to the degree of compression imposed upon the air entrapped in the left-hand end of the cutter cylinder 141 by the cutter piston 140.

The compression of entrapped air in the left-hand end of the cylinder 141 will be proportional to the excess stroke of the cutter, which excess stroke will be directly proportional to the softness of the material encountered. Hence the extent to which the throttle valve is closed by the movement of the piston throttle 182 will be proportional to the softness of the material encountered by the related cutter. The partial closing of the throttle valve so effected limits the rate of flow of high pressure fluid to the right-hand end of the cutter cylinder through the port 1 upon the succeeding stroke or strokes of the cutter piston, thereby decreasing the supply of power to the cutter piston in proportion to the softness of the material encountered.

By reason of the clearance space 253 around the outer surface of the control piston 183, or the use of a bleed opening such as that designated 249, the pressure upon opposite sides of the controller piston will gradually be equalized and the high pressure set up in the left-hand end of the control cylinder 168 will gradually be dissipated by the escape of the compressed fluid around or through the control piston 183 to the opposite side of the piston where such compressed fluid upon succeeding strokes of the piston merges with the constantly maintained low pressure, by reason of the communication afforded through the ducts 4ᶻ—4ʷ and duct 237 which communicates with the reservoir of low pressure. Hence the controller piston 183 will tend to resume the normal position illustrated in Figs. 6 and 7 by reason of the fact that the end of the piston throttle valve 182 is constantly exposed in the throttle valve bushing 180 to the high pressure fluid constantly supplied to the throttle valve bushing. Except when the outer or left-hand face of the control piston 183 is subjected to the influence of the high pressure resulting from the compression of fluid entrapped and compressed in the left-hand end of the cutter cylinder 141, the force exerted upon the end 256 of the piston throttle 182 is sufficient to move the control piston 183 to the position shown in Figs. 6 and 7 where the throttle valve is opened to its full extent. Unless therefore the cutter continues to have an excess outward movement by reason of encountering material easily penetrated, the throttle valve will return to open position in which a full supply of high pressure fluid will be supplied to the related cylinder through its throttle and the connecting ducts and port.

From the foregoing it will be apparent that in the operation of my improved apparatus when an individual cutter encounters soft material not requiring a full supply of power, the waste of power and shock to the apparatus which would result from a full supply of power under such condition is automatically corrected by means brought into action by the stroke of the cutter resulting from encountering low resistance. Furthermore, automatic means are provided whereby the mechanism constantly tends to restore itself to normal conditions wherein a full supply of power is maintained, the diminished power supply being maintained only if the cutter continues to encounter slight resistance.

It will be apparent that I have provided a rock cutting apparatus wherein a plurality of fluid actuated reciprocating cutters are mounted upon a rotative head whereby the different cutters are in turn opposed to the rock face in which the cut is being made; that automatic means are provided for bringing the cutters to rest during that part of their movement in which they are not opposed to the rock face being operated upon, and that means are provided for supplying power to each individual cutter in proportion to the resistance encountered thereby when in operation.

The cutters are brought to rest during the inactive half of their revolution by means of the gravity valve 191 as above described. The gravity valves are so related to the vent passages that they maintain the vent passage closed during the semi-revolution of the related cutters, wherein those cutters are not directed against the rock face. It will be apparent that during the period when the vent is maintained closed by the gravity valves, the differential valves will occupy the position illustrated in Fig. 6 and 7, in which position the high pressure fluid admission ports to the cutters are closed. The closing of the outlet of the vent passages by the gravity valve acts to maintain the differential valves in the position illustrated in Figs. 6 and 7 by reason of the fact that the high pressure fluid admitted to the chamber 175 opposed to the large part of the differential piston has no means of escape, and hence the preponderance of force arising from high pressure fluid acting upon the large end of the differential piston, being opposed only by a similar degree of pressure acting upon the small end of the differential piston, moves the differential piston to the position shown in Fig. 7 and maintains it in that position until the gravity valve again opens, which opening occurs at the time when the related cutters again become opposed to the rock face.

Not only are the various cutters maintained against reciprocation during the idle half of their revolution, but they are invariably drawn inward when at rest by reason of the fact that low pressure fluid is constantly acting upon the forward side of the cutter piston 140 by reason of the admission of low pressure fluid to the forward part of the cutter cylinders through the duct 237.

If it is necessary for any purpose, such as testing the cutters, to try their operation during the semi-revolution when they are turned away from the rock face, the hand vent valve 205 may be turned to such position as to establish communication between the duct 3ᶜ—3ᵈ and the atmosphere through the groove 206 in the side of the plug of the valve 205. The effect of so adjusting the hand valve will be to exhaust the pressure in the chamber 175 at the left-hand of the differential cylinder, thereby permitting the high pressure in the chamber 175 at the right-hand of the differential piston to move the differential piston valve to the left from the position shown in Fig. 7. The movement so caused of the differential valve piston will have the effect of admitting high pressure fluid to the cutter cylinder 141 thereby forcing the cutting piston outward and imparting an outward stroke to its cutter. Upon again turning the hand valve to closed position, high pressure will again build up in the chamber 175 at the left of the differential cylinder, thus causing the differential piston to move back to the right of the differential cylinder, thereby cutting off the admission of high pressure fluid and opening the cylinder 141 to the exhaust. This has the effect of again withdrawing the cutter.

The manipulation of the hand vent valve 205 above referred to is easily accomplished by reason of the relatively slow rotation of the rotative head. In case it is desired to remove any one of the cutter heads 145 from its piston rod 144 it is necessary only to impart an outward movement to the cutter by connecting the related differential cylinder chamber 175 with the atmosphere through the valve 205, thus moving the cutter outward. While the cutter remains outward, as it will remain until the valve 205 is again turned to close the vent passage, the screw plug 156 in the side of the cutter guide, shown in Figs. 6 and 7, may be removed and a bar or block inserted through the opening 155 with its end projecting over the solid base 149 of the cutter holder bushing. The valve 205 is then turned to such position as to close the vent of the related differential cylinder, whereupon high pressure builds up the chamber 175 thereof, thus moving the differential piston to the right, whereupon low pressure fluid in front of the related cutter piston 140 will force that piston inward and cause the related cutter head to contact with the inserted block or bar with such force as to drive it off from its piston rod 144.

I claim:

1. In a rock cutting apparatus, a head revoluble on an axis transverse to the direction of advance, reciprocatory cutters mounted upon said head, means operative during part of the revolution of said head to cause said cutters to reciprocate, and means to maintain said cutters out of operation during the remaining part of the revolution thereof.

2. In a rock cutting apparatus, a head revoluble on an axis transverse to the direction of advance, reciprocating cutters mounted upon said head, means operative during part of the revolution of said head to cause said cutters to reciprocate, means operative during the remaining part of the revolution of said head to prevent reciprocation of said cutters, and hand-controlled means for imparting reciprocatory movement to said cutters during part of the revolution of said head when the first-named means is inoperative.

3. In an apparatus of the class described, a head revoluble on an axis transverse to the direction of advance, reciprocatory cutters mounted on said head, means for reciprocating said cutters, automatic means controlled by the revolution of said head for periodically rendering said reciprocating means inactive, hand controlled means for rendering said cutters inoperative and for imparting reciprocatory movements to said cutters when the first mentioned means for reciprocating the cutters is inactive.

4. In an apparatus of the class described, a head revoluble on an axis transverse to the direction of advance, a plurality of reciprocatory cutters mounted on said head on opposite sides of said axis, means for rotating said head, means for reciprocating said cutters, and means for automatically arresting the reciprocation of the cutters while traveling on the side of said axis opposite the material being operated upon.

5. In a rock-cutting apparatus, a cutter head mounted to rotate about a horizontal axis extending transversely to the direction of advance of the apparatus, a plurality of cutters mounted on said head on opposite sides of said axis, means to rotate said head through successive complete revolutions, and means actuated independently of said last-named means for reciprocating said cutters.

6. In a rock cutting apparatus, a rotary cutter head, a shaft on which said cutter head is mounted, a plurality of cutters carried by said head, fluid-actuated means for reciprocating said cutters, fluid connections through said shaft to said cutters, a member fixed on said shaft, and a motor carried by said head and operatively engaging said member for rotating said head on said shaft.

7. In a rock cutting apparatus, a frame, a rotary cutter head, a shaft carried by said frame upon which said rotary cutter head is mounted, a plurality of cutters mounted on said head to reciprocate outwardly from the axis thereof, fluid-actuated means for operating said cutters, fluid connections through said shaft leading to said cutter-operating means, and means for automatically rendering said fluid-actuated operating means of said cutters inoperative during the period when they are out of engagement with the surface operated upon.

8. In a rock-cutting apparatus, a frame, a fixed shaft mounted on said frame, a cutter head mounted to rotate on said shaft, a pinion fixed on said shaft, and a motor mounted on said cutter head and operatively connected to said pinion to effect the rotation of the cutter head.

9. In a rock cutting apparatus, a frame, a fixed horizontal shaft mounted adjacent the forward end of said frame and extending transversely to the direction of advance of said apparatus, a cutter head rotatably mounted on said shaft, a plurality of fluid actuated reciprocating cutters carried by the cutter head, means for admitting compressed fluid through said shaft and cutter head to said cutters, and fluid actuated means carried by said cutter head and operatively connected to said shaft for effecting the rotation of the cutter head.

10. In apparatus of the class described, a cutter head revoluble on a horizontal axis extending transversely of the direction of advance of said apparatus, a series of reciprocatory cutters mounted on said head and adapted to reciprocate in lines normal to the axis of said head, and another series of cutters adapted to reciprocate in lines inclined to the axis of said head and to form inclined continuations of the cutting head by the first-mentioned series of cutters.

In testimony whereof, I have subscribed my name.

ROBERT TEMPLE.

Witnesses:
HENRY A. PARKS,
WALTER A. SCOTT.